US006817506B2

(12) United States Patent
Wicha

(10) Patent No.: US 6,817,506 B2
(45) Date of Patent: Nov. 16, 2004

(54) METHOD AND DEVICE FOR FEEDING A WEB

(75) Inventor: Lothar Johann Wicha, Marktheidenfeld (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 53 days.

(21) Appl. No.: 10/275,970

(22) PCT Filed: May 5, 2001

(86) PCT No.: PCT/DE01/01711

§ 371 (c)(1), (2), (4) Date: Nov. 18, 2002

(87) PCT Pub. No.: WO01/87607

PCT Pub. Date: Nov. 22, 2001

(65) Prior Publication Data

US 2003/0116040 A1 Jun. 26, 2003

(30) Foreign Application Priority Data

May 16, 2000 (DE) ........................................ 100 24 012

(51) Int. Cl.[7] .................................................. G03B 1/56

(52) U.S. Cl. ........................... 226/92; 226/93; 101/228; 355/219

(58) Field of Search .............................. 226/91, 92, 93, 226/173; 101/228; 355/219

(56) References Cited

U.S. PATENT DOCUMENTS 3,085,346 A 4/1963 Allander et al.
4,063,505 A 12/1977 Sasamoto et al.
4,706,862 A 11/1987 Theilacker
4,987,830 A 1/1991 Fukuda et al.
5,029,742 A * 7/1991 Theilacker et al. ........... 226/92
6,513,428 B1 * 2/2003 Sappal et al. ............... 101/228
6,631,678 B2 * 10/2003 Cousin et al. .............. 101/228

FOREIGN PATENT DOCUMENTS

DE 33 09 121 C1 8/1984
DE 92 15 764.5 U1 2/1993
DE 198 37 361 A1 2/2000
EP 0 118 860 B1 3/1989
EP 0 425 741 A1 5/1991

* cited by examiner

*Primary Examiner*—Kathy Matecki
*Assistant Examiner*—Evan Langdon
(74) *Attorney, Agent, or Firm*—Jones Tullar & Cooper, PC

(57) ABSTRACT

Webs of printable materials which are fed into a printing machine are provided with a feed tip that allows the web to be rapidly and releasably connected to a the web feed device. The feed tip has a thickened section which is generally perpendicular to the direction of web transport and which cooperates with a carrier element that is fastened to the web feed device. The carrier element has an oblong cavity which extents in the direction of web transport and which cooperates with the thickened portion of the web to form a stop that is perpendicular to the direction of web transport.

14 Claims, 4 Drawing Sheets

METHOD AND DEVICE FOR FEEDING A WEB

FIELD OF THE INVENTION

The present invention is directed to a method and to a device for drawing in a web in a web-fed rotary printing press. The web has a draw-in tip which is made thicker than the rest of the web.

BACKGROUND OF THE INVENTION

A device for attaching a web of material to a carrier of a web draw-in device is known from EP 0 118 860 B1. A fastening device, that receives the end of the web of material, is loosely suspended by a loop fastened on the former from the carrier, of a draw-in element.

A draw-in device is described in G 92 15 764 U1, in which a cable, which is attached to the draw-in tip, is pushed vertically in respect to the conveying direction into the openings of carriers. The cable is maintained on the carrier, secure against slipping out opposite the conveyance direction, by the use of a headpiece of the cable.

DE 198 37 361 A1 discloses a device for drawing in a web of material to be imprinted. A free end of the draw-in tip is threaded through an opening of a carrier which is connected with the draw-in device and is made into a loop by a hook-and-loop closure.

EP0 425 741 A1 shows a device for drawing in a web and having a draw-in assembly. A positive connection opposite and transversely to the conveying direction with a carrier arranged on the draw-in assembly can be made by the use of a coupling element arranged on a draw-in tip. The coupling element, embodied in a stepped manner, and the carrier can be connected with each other, or released from each other, by a relative movement along the conveying direction.

SUMMARY OF THE INVENTION

The object of the present invention is based on providing a method and a device for drawing in a web.

In accordance with the present invention, this object is attained by providing the web to be drawn in with a thickened portion. This thickened portion is received in a carrier that is part of the web draw-in device. The thickened portion is slid into the carrier in a direction perpendicular to the web conveying direction and is then moved in the carrier in a direction parallel to the conveying direction. This second movement takes place with limited travel in the direction perpendicular to the conveying direction.

The advantages which can be realized by the present invention reside, in particular, in that the connection between the draw-in assembly or device and the draw-in tip is positive in the conveying direction, which connection is embodied in a self-securing manner in respect to releasing the connection during the operation, i.e. when drawing the web in. The danger of a spontaneous and unintentional release of the connection, such as can occur in a connection with simply designed carriers, is reduced by a travel limitation imposed on the draw-in tip on all sides of the tip, which is closed to a great extent.

The connection between the draw-in tip and the draw-in assembly or device is substantially achieved in an advantageous manner by the requirement of a two-step movement, which movement is guided to a great extent, of the draw-in tip in respect to the carrier. In an advantageous manner, the suspension and securing of the tip in the carrier takes place in two defined movement directions, which extend almost perpendicularly with respect to each other. In a first step, the suspension of the tip in the carrier takes place in a direction which is almost perpendicular in respect to the web conveying direction. In a second step, the connection is secured by a relative movement between the clamping element and the draw-in tip in which the tip moves relative to the clamping element in a direction opposite to the web conveying direction. The movement, which is guided to a great extent and which extends almost perpendicularly in respect to the conveying direction for a suspension in a narrowly bordered forward direction provides increased assurance against unintentional release of the tip from the carrier.

In a particularly advantageous embodiment, a sequence of two defined movements is required for connecting, or releasing the tip and the carrier, wherein one movement represents a rotational movement, which movement is not one typically occurring in the draw-in process, in a direction R. With this sequence of movements, the connection is not sensitive to unintentional release because of fluctuations in the web tension or in web speed during draw-in.

In at least one area in which the draw-in tip, or a thickening at the draw-in tip, and the carrier engage each other, a first movement is possible only guided along in a direction which is predetermined to a great extent.

In addition to providing a high degree of assurance that the connection will not become undone, a substantial advantage of the present invention is its rapid and simple operability. Elaborate opening or closing by the use of tools, gluing or threading into closed eyes is not required.

BRIEF DESCRIPTION OF THE DRAWINGS

Preferred embodiments of the present invention are represented in the drawings and will be described in greater detail in what follows.

Shown are in.

DESCRIPTION OF THE PREFERRED EMBODIMENTS

Figure 1:
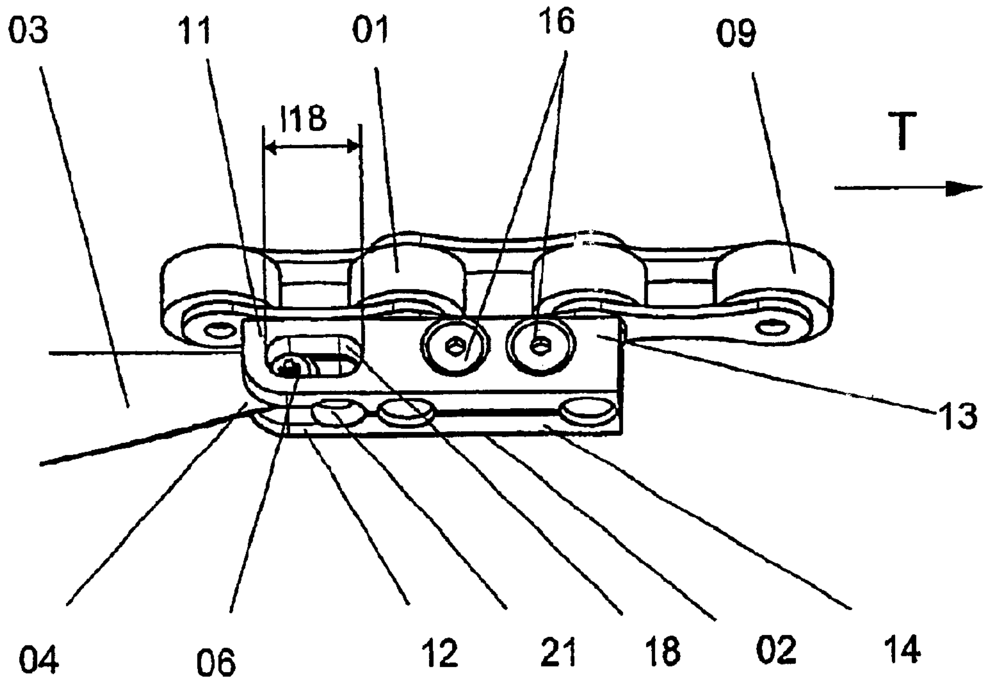
FIG. 1, a perspective view of a device for drawing in a web in accordance with the present invention, FIG. 2, a side elevation view, partly in cross-section, through the device for drawing in a web, in FIG. 3, a side elevation view of the device for drawing in a web, in FIG. 4, a top plan view of a second preferred embodiment of the device for drawing in a web in accordance with the present invention, in FIG. 5, a top plan view of a third preferred embodiment with an inclined suspension device, and in FIGS. 6*a*-6*e*, several preferred embodiments of a thickened or portion of the draw-in tip in accordance with the present invention.

Drawing-in of webs, for example webs of material to be imprinted in web-fed rotary printing presses, takes place, in a generally known manner, by the operation of a web draw-in device 01, for example such as a chain 01, a belt or a cable, as depicted somewhat schematically in FIG. 1. As a rule, the chain 01 is located adjacent the side of the paper web to be drawn in and is conveyed through the printing press, for example on a rail, along a path provided for the paper web. A carrier 02 is arranged on the chain 01, and on, or to which a start 03 of the paper web is fastened. The chain 01 may be embodied as a roller chain 01 with rollers 09, for example.

Figure 3:
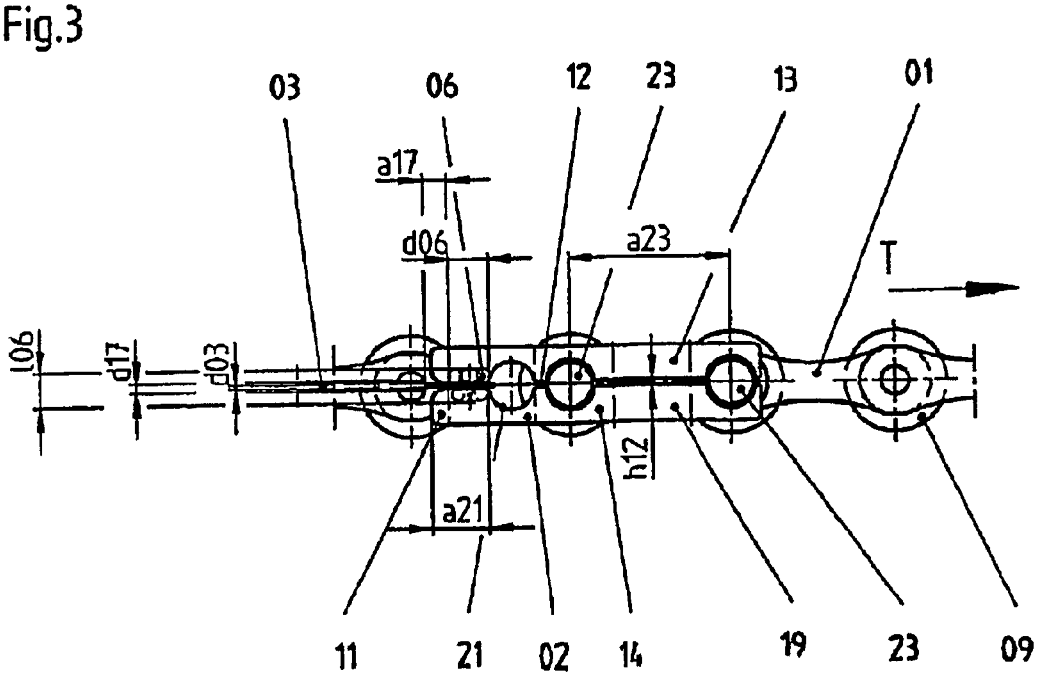

In the embodiment depicted in FIG. 1, the start 03 of the paper web is configured as a draw-in tip 03, which is connected with the paper web, and whose free end 04 can be positively connected with the carrier 02 which is supported by chain 01 to move in the conveying direction T. The draw-in tip 03 can be in the form of a foil which is connected with the paper web, a reinforced end of the paper web itself, a single- or multi-part reinforcement or extension, which is connected in a non-positive manner, in a positive manner or is incorporated into the material. In an advantageous manner, the draw-in tip 03 extends in the conveying direction T at an acute angle toward the laterally arranged chain 01, and is embodied, at least in the area of the connection with the chain 01, or the carrier 02, in a manner which is substantially tear-resistant, for example as a metal or as a plastic strip. The draw-in tip 03 is flat and flexible and has a reduced thickness d03, as seen in FIG. 3, wherein preferably d03<1.5 mm, for example d03=0.5 mm. Draw-in tip 03 preferably extends on a conveying plane. The conveying plane is understood to be that plane whose length extends in the conveying direction T on the plane of the carrier 02 through the conveying direction T and the imagined position of the web.

Figure 6:
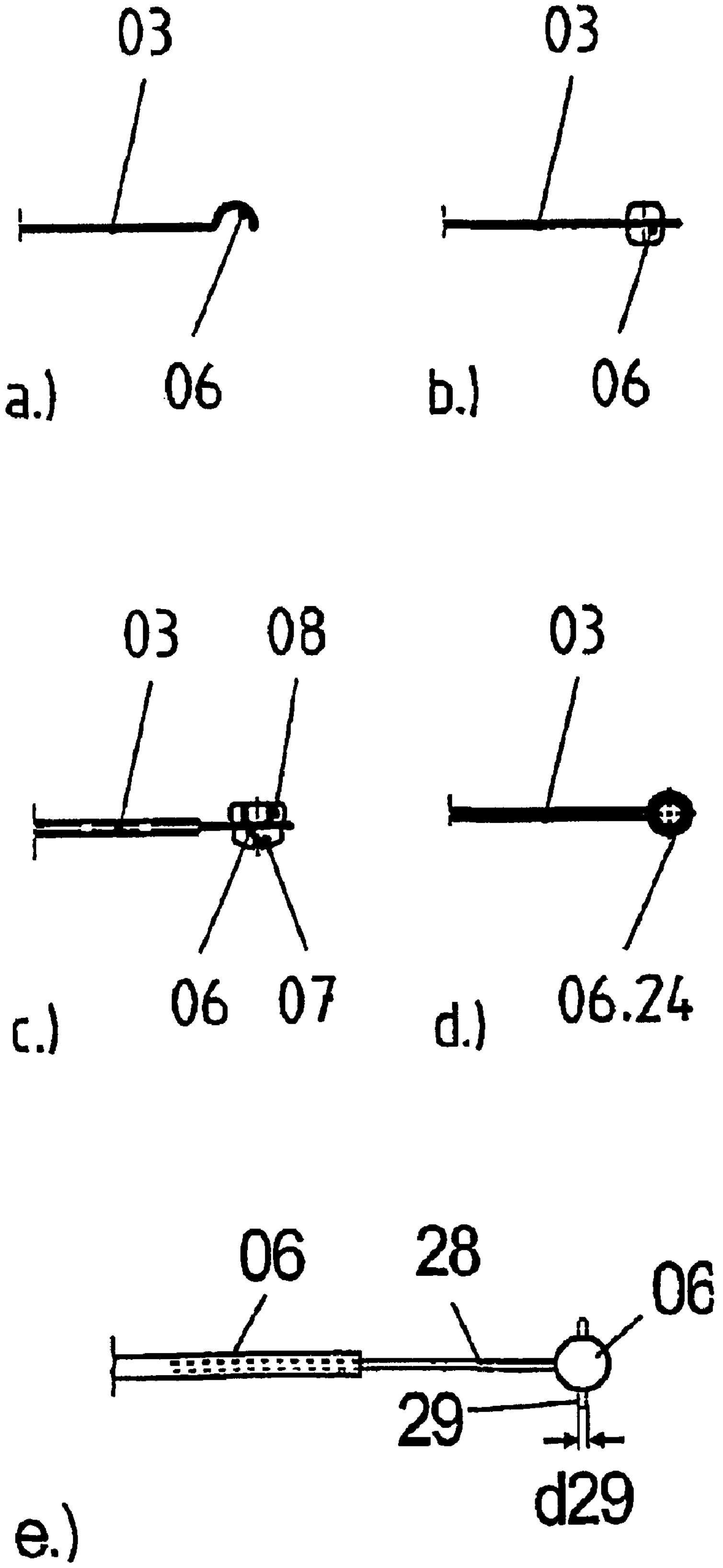

On its free end 04, the draw-in tip 03 has a thickening or an enlargement 06 formed in a direction with respect to the web and to the web draw-in tip 03 which direction is almost perpendicular with respect to the conveying direction T and which draw-in tip 03 acts together, in a positive manner, with the carrier 02 in the course of the draw-in of the web in the conveying direction T. The thickening or enlargement 06 can be a raised bump generated by forming or by embossment, as seen in FIG. 6*a*, by the provision of a pin or bolt penetrating the draw-in tip 03, as seen in FIG. 6*b*, or as any other raised section, which causes an increase of the cross-section of the draw-in tip 03 in respect to a direction perpendicular with respect to the conveying direction T. The shapes of the cooperating carrier 02 and the draw-in tip thickening 06 are reciprocally provided in such a way that a suspension, which is guided to a great extent, and a connection between the carrier 02 and the draw-in tip 03 with the thickening 06 takes place, which suspension and connection is limited in at least five of the six spatial directions, and in one embodiment of the invention, in six of the six spatial directions. A movement, that is guided to a great extent, is required along part of the connective path, at least in the area in which the carrier 02 and the draw-in tip 03, or the thickening 06, penetrate each other. Because of the reciprocal shaping of the tip 03 and the carrier 06, the connective movement between the two takes place within a narrow angular range. Two examples from the multitude of possible options have been taken in what follows and will be described in greater detail.

In the first example, the thickening 06, as depicted in FIG. 6*c*, is embodied as a head of a screw 07 which screw 07 is extending perpendicularly through a recess, not specifically represented, in the draw-in tip 03 with the screw head situated on one side of the draw-in tip 03 and, on the other side of the tip 03, as a nut 08, which is, for example, fixed against relative rotation, and which is cooperating with the screw 07. The free end 04 of the draw-in tip 03, as provided with the thickening 06 described above, cooperates with the carrier 02 of the chain 01 when the paper web is drawn in, as depicted in FIG. 1.

At least at its end 11 that is trailing in the conveying direction T, as seen in FIG. 1, the carrier 02 is provided with a slit 12 extending approximately parallel with the conveying plane. In the preferred embodiment, the carrier 02 is embodied for this purpose as a two piece clamping element 02 with a first cheek or segment 13 and a second cheek or segment 14, which two segments 13 and 14 are connected with each other by two screws 16 extending almost perpendicularly in relation to the slit 12. To provide the slit 12 with a height h12, it is possible to arrange a spacer element between the segments or cheeks 13 and 14, for example. However, the segments or cheeks 13 and 14 can also be offset from each other on their sides respectively facing each other, so that a slit 12 is created when they are brought together. A one-piece embodiment of the carrier or clamping element 02 is also possible, wherein the slit 12 is embodied as a sawn cut, for example. In the configuration of the carrier 02 shown in FIG. 3, the height h12 of the slit 12 is defined by two bolts 23, which connect the clamping element 02 with the chain 01 and which are arranged between the two segments 13 and 14.

In the area of its trailing end 11, the clamping element 02 has an elongated hole or aperture 18 that is passing, almost perpendicularly with respect to the conveying direction T, through both segments or cheeks 13 and 14, and which aperture 18 extends at least partially along its length l18 in the conveying direction T.

The outer lateral side 19 of the clamping element 02 has a recess 21, for example a bore 21, with side 19 being opposite the chain 01. The bore 21 is arranged in such a way that it connects the outer side 19 with the elongated hole or aperture 18 at the the end of the elongated hole or aperture 18 which is remote from the draw-in tip 03.

Figure 2:
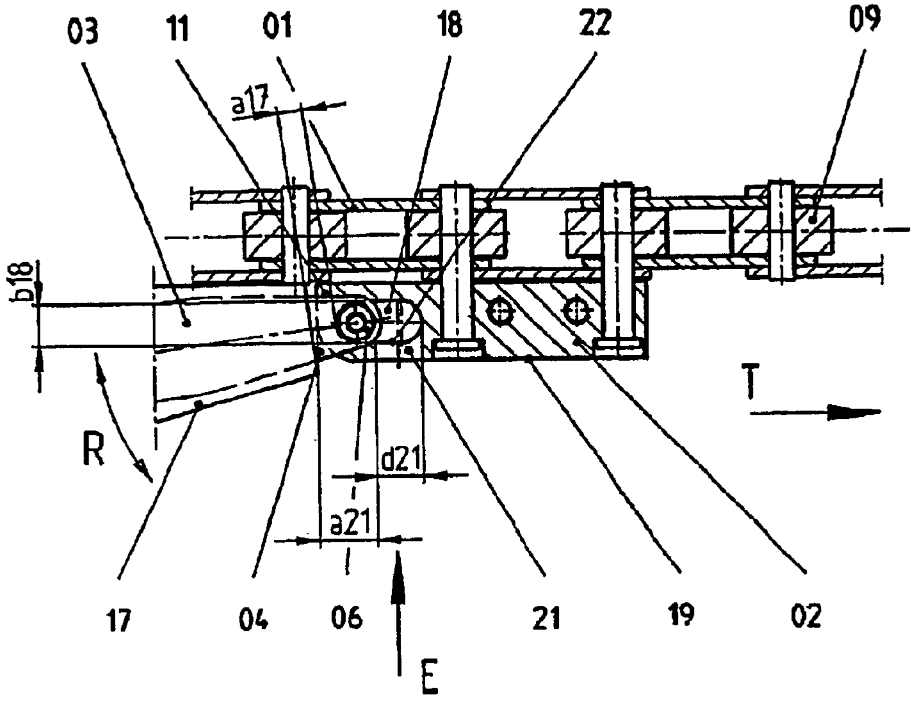

The bore 21 has a diameter d21, which corresponds at least to the largest cross section of the thickening 06, and at least to the largest of the dimensions of the length l06 and the maximum diameter d06 of the thickening 06 constituted by the screw 07 and the associated nut 08. The elongated hole or aperture 18 also has a width b18, as seen in FIG. 2, which corresponds at least to the maximum diameter d06 of the thickening 06. The length l18 of the elongated hole or aperture 18 is greater than the diameter d21 of the lateral bore 21. Preferably, the length l18 is greater than the sum of the diameter d21 of the bore 21 and half the maximum diameter d06 of the thickening 06.

If the thickening 06 is embodied as a pin 06 penetrating through the draw-in tip 03 perpendicularly, as seen in FIG. 6*b*, the diameter d21 of the bore 21 is selected to be at least equal to the length l06 of the pin 06, and the width b18 to be at least equal to the diameter d06 of the pin 06. Thus a lateral interior wall 22, extending in the direction of the length l18, of the elongated hole 18 acts, together with the thickening 06, to form a detent 22. The width b18 of the elongated hole 18 can also taper towards the trailing end 11 of the clamping element 02 in such a way that a frictional connection between the thickening 06 and the clamping element 06 is provided by the tensile force directed in the conveying direction T.

The height h12 of the slit 12, as seen in FIG. 3, is at least equal to the thickness d03 of the draw-in tip 03, and is less than the length or the height l06 of the thickening 06, so that the draw-in tip 03 can be guided into the slit 12, at least in the area of the draw-in tip free end 04, but that the thickening 06, together with the slit 12, and almost all of the entire interior wall 22, with the exception of the bore 21, constitutes the detent 22.

In one embodiment of the present example, as seen in FIG. 2, the draw-in tip 03 is provided with a second thickening 17, for example a casing of the draw-in tip 03 in the form of a woven tape. This thickening 17 on the draw-in tip 03 is spaced away from the first thickening 06 at a distance a17 and in a direction opposite the end of the draw-in tip 03. Advantageously, the distance a17 is less than a distance a21 of the recess 21, but must at least be selected to be as large as an inner width l18 of the longitudinal hole 18 from the side 19 of the clamping element 02.

During operation, i.e. in the suspended state of the draw-in tip 03 in the clamping element 02, the thickening 06 is connected together with the end 04 of the draw-in tip 03 and their travel is limited in six directions. In the preferred embodiment, the draw-in tip 03 is positively connected in all directions perpendicular in respect to the conveying direction T and is movable parallel in respect to the conveying direction T, but its travel is limited. In the embodiment with the draw-in tip 03 having the second thickening 17, the freedom of movement of the draw-in tip 03 in the conveying direction T is additionally limited and, for releasing the connection, the draw-in tip 03 initially makes a rotation in the direction R, as seen in FIG. 2, around an axis which, in an advantageous manner, extends almost perpendicular in respect to the conveying direction T. In the tightened state in particular, for example during drawing in of the web in the conveying direction T, the thickening 06 is also positively, or at least with limited travel, connected opposite to a suspension direction E parallel in respect to the longitudinal axis E of the bore 21, which represents the direction in which the thickening 06 is conducted into the clamping element 02 in the course of suspending the draw-in tip 03.

The clamping element or carrier 02 is releasably fastened to the chain 01 by use of the two bolts 23, or screws 23. In an advantageous manner, a spacing distance a23 between the bolts 23 in the conveying direction T, as seen in FIG. 3, is a whole number multiple of the distances between the shafts of two roller 09 of the chain 01.

Figure 4:
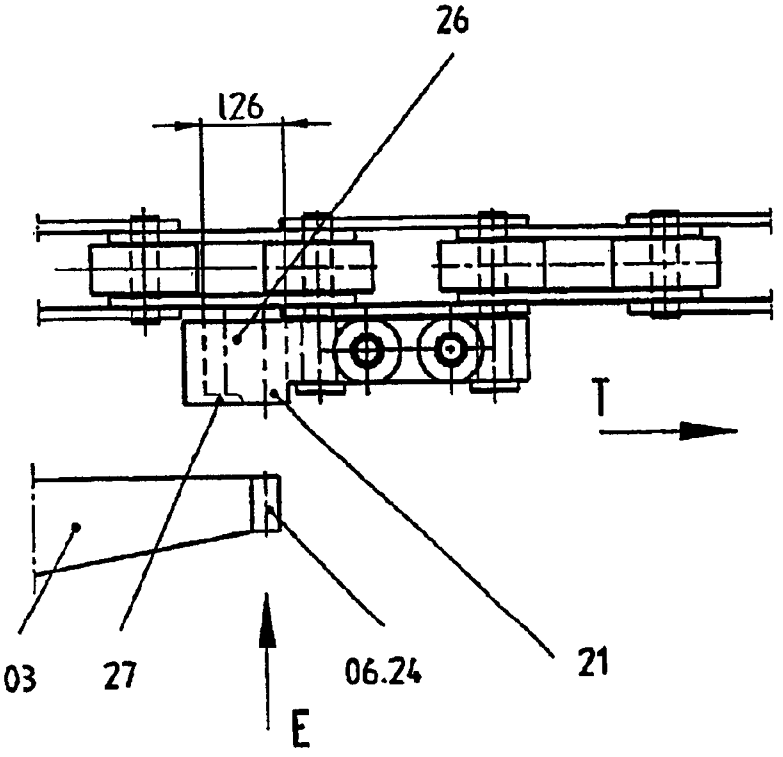

In a second preferred embodiment of the device for drawing in a web, as seen in FIG. 4 , the thickening 06 is embodied as a bead 06 on the free end 04 of the draw in tip 03, as seen in FIG. 6*d*. This bead 06 can be, for example, a small tube 24, as shown in FIG. 6*d* that is worked into the end 04 of the draw in tip 03, or as a pin or a groove, as shown in FIG. 6*a*, that is formed in the draw in tip 03 during its manufacture. The bead 06 extends in the conveying plane almost perpendicular in respect to the conveying direction T.

As in the first preferred embodiment, this bead 06 cooperates positively with an elongated hole 26 formed in the carrier 02 in a manner in which it limits travel, and in the conveying direction T. The elongated hole 26 of the second preferred embodiment, as depicted in FIG. 4, does not extend perpendicularly, in respect to the conveying plane, and to the bore 21, through a clamping element 02, but instead is almost parallel with the conveying plane. Over its length l26, the elongated hole 26 extends nearly parallel in respect to the conveying direction T. To prevent the bead 06 from slipping laterally out of the elongated hole 26, the elongated hole 26 is discontinuous on the lateral outer side 19 of the clamping element 02; i.e. the side of the clamping element opposed to the chain 01, so that a projection 27 remains on the side 19 as a detent 27. This lateral projection 27 is located on the side of the elongated hole 26 which is closer to the trailing end 11 of the clamping element 02 and thus prevents the suspended thickening 06 of the draw-in tip 03 from sliding out of the clamping element 02 in a direction opposite to the suspension or attachment direction E. The portion of the elongated hole 26 which is continuous on the outer lateral side 19 corresponds to the recess 21 in the first preferred embodiment that is required for suspending the draw-in tip 03. On the side facing the chain 01, the elongated hole 26 can be continuous. As a rule, the draw-in tip 03 is prevented from sliding out of this side of the clamping element 02 by the adjoining chain 01 which thus also serves as a travel limiter.

In a preferred embodiment, the elongated hole 26 can be configured as an elongated hole 26 which conically tapers in a direction opposite the conveying direction T, and which is provided with a frictional connection by the thickening 06, in addition to the travel limitation, when the clamping element 02 and the draw-in tip 03 are moved relatively away from each other in the conveying direction T.

Figure 5:
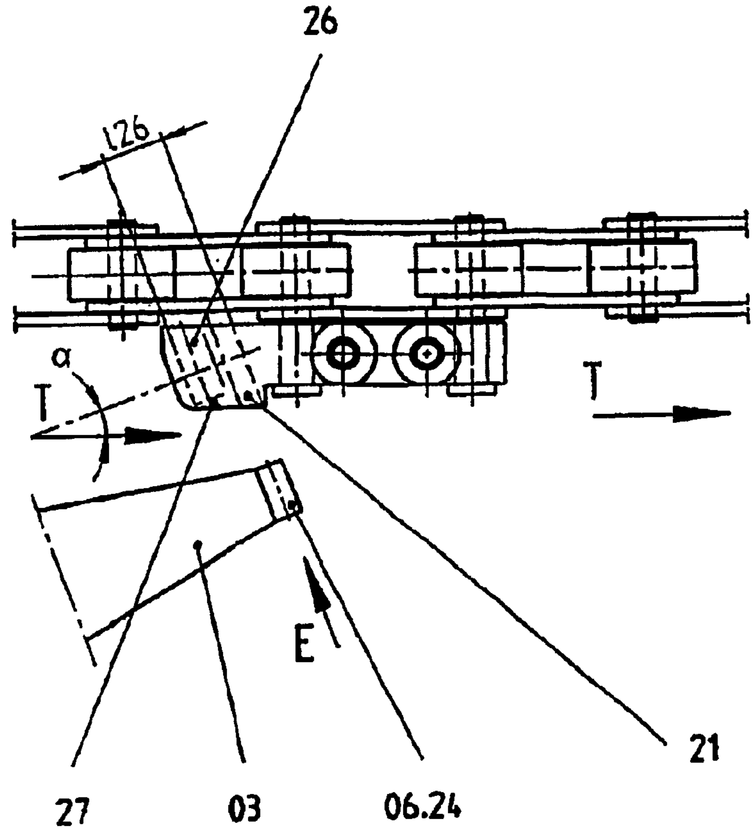

The elongated hole 26 can also be arranged in the clamping element 02 in such a way that its length l26 does not extend parallel in respect to the conveying direction T, but is inclined in relation to the conveying direction T at an angle α which is not equal to 0° against the conveying direction T. In this preferred embodiment, as indicated in FIG. 5, the inclination α between the orientation of the elongated hole 26 of the length l26 and the conveying direction T is approximately 20°. This embodiment can be selected, for example, for assuring even more security against the thickening 06 laterally slipping out of the longitudinal hole 26, but also, if required, to point in the direction of a resultant line for the tensile force.

In a configuration that is suitable for use with both preferred embodiments, the thickening 06 on the draw-in tip 03 is formed as a ball 06 or as a cylinder 06 which are arranged on one end of a belt 28 or cable 28, which in turn has been incorporated into the draw-in tip 03 as seen in FIG. 6*e*. In actual use, a steel cable 28 with a steel ball 06 or a steel cylinder 06, for example a Bowden cable 06, 28, is preferable. When using a cylindrical thickening 06, in the first preferred embodiment an axis of the cylindrical thickening 06 is oriented nearly perpendicularly in respect to the paper plane. In, in the second preferred embodiment this axis is oriented nearly parallel with the paper plane.

The embodiment in accordance with FIG. 6*e* can be modified in an advantageous manner in that additionally a bolt 29, or, for example, a pin 29, is arranged on the thickening 06, which designed as a ball 06. This bolt or pin is shown in dashed lines in FIG. 6*e*, since this is optional. In the suspended state, this pin 29 is used for securing the ball 06 in the recess 18. The pin 29 is oriented, for this purpose, in such a way that, in the suspended end state, its longitudinal direction extends perpendicular in relation to the plane of the slit 12. If the recess 18, the bore 21 and the slit 12 are aligned as represented in FIG. 1, the pin 29 extends perpendicular to the paper plane, or to the plane of the draw-in tip 03. If the arrangement is rotated by 90°, the pin correspondingly extends in the paper plane, or the plane of the draw-in tip 03.

In this embodiment, four different movements, of which two are guided translatory movements and two are rotatory movements, are required for suspension. Initially, the ball 06 must be inserted along the suspension direction E, as seen in FIG. 2, laterally into the bore 21 in such a way that the pin 29 is guided through the slit 12 into the interior of the recess 18. To do this, a diameter d29, or a thickness d29, of the pin 29 must be less than the height h12 of the slit 12. Then the ball 06 with the pin 29 must be turned by approximately 45° in the recess 18 around an axis along the insertion direction E. Thereafter, the translation opposite the conveying direction T and a rotation in the direction R around an axis which is nearly perpendicular in respect to the conveying direction and the insertion direction E can take place.

The configuration of the thickening 06 and of the cooperating bore 21, or the recesses in the form of elongated holes 18, 26, or differently shaped recesses 18, 26 in the carrier or clamping member 02 is possible in a multitude of ways in order to make possible a guided suspension in the suspension direction E of the draw-in tip 03 perpendicularly to a great extent, or with a component perpendicular to the conveying direction T, and the travel limiting securing of the draw-in tip 03 in the carrier 02 against movements in a direction perpendicular to the conveying direction T. It is advantageous that the clamping element 02 is provided with a recess 18, or 26, which has at least one component of the diameter, or the inner width l18 or l26 in the conveying direction 26, which is greater than the corresponding component of the diameter, or the inner width d21 of the recess 21, which is required for the suspension and which is connected with the recess 18 or 26. Because of the separation of the movements for suspension and for securing, a travel limitation is also provided in directions perpendicular to the conveying direction T, in particular also counter to the suspension direction E.

The mode of functioning of the device for drawing in a material to be imprinted, in accordance with the present invention is as follows:

For drawing in a web of material to be imprinted, its start is provided with a draw-in tip 03, which has a thickening 06 on its free end 04. This free end 04 of the draw-in tip 03, with the thickening 06, is pushed, in the suspension direction E, into the recess 21. Simultaneously the end 04 of the draw-in tip 03 is slid into the slit 12 of the clamping element 02. By a movement of the draw-in tip 03 in a direction opposite to the conveying direction T, or a movement of the clamping element 02 in the conveying direction T, the thickening 06 slides in the elongated hole 18, or 26, in the direction toward the trailing end 11 of the clamping element 02. The position of the free end 04 of the draw in tip 03 is thus secured in all of the conveying direction T, or the course of the elongated hole 18 in the conveying direction, against slipping out laterally. After the web of material to be imprinted has been drawn in, the release and removal of the draw-in tip 03 takes place in the reverse order. When removing the draw-in tip 03 with a second thickening 17 at the previously mentioned distance a17 from the thickening 06, an additional relative rotation in a direction R between the draw-in tip 03 and the clamping element 02 is required for the suspension, or release of the draw-in tip 03.

While preferred embodiments of method and of a device for drawing in a web, in accordance with the present invention have been set forth fully and completely hereinabove, it will be apparent to one of skill in the art that a number of changes, for example, in the type of printing press being used, the structure of the draw-in chain and the like could be made without departing from the true spirit and scope of the present invention which is accordingly to be limited only by the following claims.

What is claimed is:

1. A method of drawing a web in a web-fed printing press including:

providing a draw in tip on the web;

providing a thickening on said draw-in tip;

providing a web draw-in device on the press and supporting said web draw-in device for movement in a conveying direction;

providing a carrier on said draw-in device and providing a recess in said carrier adapted to receive said thickening;

moving said thickening on said draw-in tip into said recess in a first direction with at least one component perpendicular to said conveying direction;

moving said thickening on said draw-in tip in said recess in a second direction with at least one component parallel to said conveying direction; and;

moving said thickening on said draw-in tip in said recess in a third direction including a rotation about an axis perpendicular to said conveying direction, said movement in said first, second and third directions taking place in a guided manner in said recess of said carrier.

2. The method of claim 1, further including moving said thickening on said draw-in tip in said a third direction subsequent to said moving of said thickening in said first and second directions, in said carrier.

3. A device for drawing in a web in a web-fed printing press comprising:

a web draw-in tip including a thickened portion;

a web draw-in assembly on the printing press, said web draw-in assembly including a carrier said carrier being supported for movement by said web draw-in device in a web conveying direction; and a first recess and a second recess in said carrier, said first recess having a first inner width in said conveying direction, said second recess connecting said first recess with a side of said carrier, said second recess having a second inner width in said conveying direction, said first inner width being greater than said second inner width and wherein said thickening of said draw-in tip can be connected with said carrier by a first guided relative movement with at least one component perpendicular to said conveying direction and by a second relative movement between said thickening and said carrier with a component parallel to said conveying direction and with limited travel perpendicularly with respect to said conveying direction.

4. A device for drawing in a web in a web-fed printing press comprising:

a web draw-in tip including a thickened portion;

a web draw-in assembly on the printing press, said web draw-in assembly including a carrier, said carrier being supported for movement by said web draw-in device in a web conveying direction; and a first recess and a second recess in said carrier, said first recess having a detent on a leading end of said first recess in said web conveying direction, said second recess connecting said first recess with a side of said carrier and wherein said thickened portion of said web draw-in tip is connected with said carrier by a first guided relative movement with at least one component perpendicular to said conveying direction and with at least one component parallel to said conveying direction and by a second relative movement between said thickened portion and said carrier with a component parallel to said conveying direction and with limited travel perpendicular to said travel direction, said thickened portion of said web draw-in tip being supported in said carrier with limited travel in all directions and further wherein a release of said draw-in tip from said carrier includes a third relative movement different from said first relative movement.

5. The device of claim 3 wherein said first relative movement further includes at least one component parallel to said conveying direction and wherein said first recess has a detent on a leading end in said conveying direction and further wherein a release of said draw-in tip from said carrier includes a third relative movement different from said first relative movement.

6. The device of claim 3 wherein said carrier includes a trailing end in respect to said conveying direction and further including a slit connecting a front face of said first recess and said second recess, said slit extending parallel to a conveying plane of a web.

7. The device of claim 4 wherein said carrier includes a trailing end in respect to said conveying direction and further including a slit connecting a front face of said first recess and said second recess, said slit extending parallel to a conveying plane of a web.

8. The device of claim 3 wherein said second recess has a longitudinal axis, said longitudinal axis being perpendicular to said conveying direction.

9. The device of claim 3 wherein said first recess has a greater diameter and a lesser diameter, said greater diameter extending in said conveying direction.

10. The device of claim 4 wherein said first recess has a greater diameter and a lesser diameter, said greater diameter extending in said conveying direction.

11. The device of claim 3 wherein said first recess is an elongated hole.

12. The device of claim 4 wherein said first recess is an elongated hole.

13. The device of claim 3 further including a second thickened portion on said draw-in tip, said second thickened portion being spaced from said first thickened portion and acting as a detent in said conveying direction with respect to said carrier.

14. The device of claim 4 further including a second thickened portion on said draw-in tip, said second thickened portion being spaced from said first thickened portion and acting as a detent in said conveying direction with respect to carrier.

* * * * *